United States Patent
Blakley

(10) Patent No.: US 6,789,314 B2
(45) Date of Patent: Sep. 14, 2004

(54) APPARATUS AND METHOD FOR CONNECTING SHAFTS

(75) Inventor: Robert A. Blakley, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 93 days.

(21) Appl. No.: 10/093,471

(22) Filed: Mar. 11, 2002

(65) Prior Publication Data

US 2003/0167635 A1 Sep. 11, 2003

(51) Int. Cl.[7] ................................................ B21K 3/04
(52) U.S. Cl. ................ 29/889.21; 29/889.6; 416/244 A
(58) Field of Search .............................. 27/889, 889.21, 27/889.6, 889.7, 889.71; 366/279, 314; 416/204 R, 204 A, 244 R, 244 A

(56) References Cited

U.S. PATENT DOCUMENTS

| | | | | |
|---|---|---|---|---|
| 3,580,547 A | * | 5/1971 | Amorese | .................... 366/138 |
| 3,877,706 A | * | 4/1975 | Haas et al. | .................. 277/366 |
| 4,198,373 A | * | 4/1980 | Kropp et al. | .................. 422/49 |
| 4,722,608 A | * | 2/1988 | Salzman et al. | ......... 366/330.5 |
| 4,747,722 A | | 5/1988 | Kawaguchi et al. | |
| 4,988,303 A | * | 1/1991 | Thomas | ...................... 366/285 |
| 5,088,832 A | | 2/1992 | Gambrill et al. | |
| 5,152,606 A | * | 10/1992 | Borraccia et al. | ........... 366/331 |
| 5,585,163 A | | 12/1996 | Yoshikawa et al. | |
| 5,779,359 A | * | 7/1998 | Gambrill et al. | ............ 366/273 |
| 6,435,832 B1 | * | 8/2002 | Fasano | .................... 416/204 R |
| 6,508,977 B2 | * | 1/2003 | Eckert et al. | ................ 266/235 |

FOREIGN PATENT DOCUMENTS

FR 1 554 246 1/1969

* cited by examiner

Primary Examiner—Charles T. Jordan
Assistant Examiner—T. Nguyen
(74) Attorney, Agent, or Firm—Baker & Hostetler LLP

(57) ABSTRACT

An apparatus and method is provided for connecting two shafts which may be of dissimilar materials from each other. A stub shaft of ceramic material is attached to an impeller shaft via a support hub and a steady bearing radially restrains the stub shaft.

19 Claims, 4 Drawing Sheets

APPARATUS AND METHOD FOR CONNECTING SHAFTS

FIELD OF THE INVENTION

The present invention relates generally to an apparatus and method for connecting two shafts. More particularly, the invention pertains to an apparatus and method for connecting two shafts which may be of dissimilar materials. The invention also pertains to radially restraining the lower end of a shaft assembly with a steady bearing.

BACKGROUND OF THE INVENTION

It is known in various industrial mixing applications to have a vessel that contains liquid and/or solid material that is to be mixed. Typically, a shaft extends into the vessel, and has impellers radially projecting from, and/or radially supported by, the rotating shaft. The shaft is rotationally driven by a motor, often external to the vessel. As the shaft rotates, the impellers are moved through the material and effect a mixing of the material.

In some of the vessel impeller shaft arrangements that are used, it is known for a driven shaft to extend downwardly from the top of the vessel, and have its lower end terminate before reaching the bottom of the vessel, so that the lower end of the shaft is in a suspended state from the top. In some situations where the lower end of the impeller shaft is freely suspended, or "overhung" the lower end of the shaft will tend to deflect radially (i.e., undergo off-axis movement) due to the many lateral forces that are present at the impeller(s) on the mixer shaft. To inhibit this movement, it has been known to place a steady bearing arrangement mounted to on the bottom or sides of the mixing vessel, which has a bushing that surrounds the impeller shaft near its lower end and provides axial constraints to the shaft. This arrangement also raises the lateral natural frequency of the shaft. In this manner taller vessels and longer shafts can be used.

Impeller shafts are sometimes constructed of one or more longitudinal sections. Because of the bending and torsional forces imposed on the impeller shaft, and because of the corrosive environments typically present in such mixer environments, it has been known to have the impeller shaft be constructed of one or more longitudinal sections of a metal or metal alloy such as stainless steel.

In the case of a stainless steel impeller shaft that is constrained by a lower steady bearing as described above, it has been found that the frictional contact area between the lower end of the impeller shaft and the bushing of the steady bearing can lead to undesirable wear.

A contributing factor to this undesirable wear is the fact that in a corrosive or oxidizing environment such as is often present in the mixer systems, stainless steel develops a thin oxidized coating on its surface. Normally, where friction is not present, as on the parts of the shaft not in contact with the bearing, this thin coating develops only to a certain thickness, thereafter, any further oxidation on the surface of the shaft is inhibited. However, in the region of the bushing contact, the bushing tends to continually wear off the oxidized coating as it develops. As a result, the bushing tends to continually wear away the surface of a stainless steel shaft where it contacts the shaft, reducing the overall life of the bearing/shaft connection.

Silicon carbide is not generally used for shaft purposes due to its extreme brittleness, high cost, and the ease with which it can be fractured. It does, however, possesses excellent corrosion resistant properties, extreme hardness, very high modulus of elasticity, very low coefficient of thermal expansion, etc. Metal shafts do not generally simultaneously posses these attributes.

Accordingly, it is desirable to have a shaft and bearing arrangement that can be subject to less wear than the above described arrangement. It will also be desirable to have such an apparatus and method that can be conveniently installed and serviced.

SUMMARY OF THE INVENTION

It is therefor a feature and advantage of the present invention to provide the connection of a stub shaft made of a wear resistant material, onto the lower end of the driven mixer shaft.

It is another feature and advantage of the present invention to provide an apparatus and method for connecting shafts to one another that are made of dissimilar materials.

It is another feature and advantage of the present invention to provide such an apparatus and method that can be conveniently installed and serviced.

The above and other features and advantages are achieved through the use of a novel apparatus and method for connecting shafts as herein disclosed. In accordance with one embodiment of the present invention, an apparatus is provided for restraining an end of a rotatable impeller shaft. The apparatus includes a support hub connected to the end of the impeller shaft for rotation therewith. A stub shaft is rigidly mounted to the support hub for rotation therewith. A steady bearing surrounds at least a portion of the stub shaft. In another aspect, the stub shaft may be made of a ceramic, for example, silicon carbide. In another aspect, the stub shaft may be press-fit into the support hub.

In still another aspect, the invention provides an apparatus for restraining an end of a rotatable impeller shaft. The apparatus includes a stub shaft. A supporting means supports the stub shaft, and is connected to the end of the impeller shaft for rotation therewith. Bearing means are provided for radially restraining at least a portion of the stub shaft.

In another aspect, a method is provided for restraining an end of a rotatable impeller shaft. The method includes mounting a stub shaft in a support hub, attaching the support hub to the lower end of the impeller shaft, and placing the stub shaft into a bearing assembly.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides a novel apparatus and method for providing bearing support of a mixer impeller shaft. In some embodiments, the invention includes the connection of a stub shaft made of a wear-resistant material onto the lower end of the driven impeller shaft. The invention also provides in some embodiments a connection arrangement for connecting the stub shaft onto the end of the impeller shaft. The stub shaft may be made of a wear resistant material such as a ceramic, for example silicon carbide.

Figure 1:
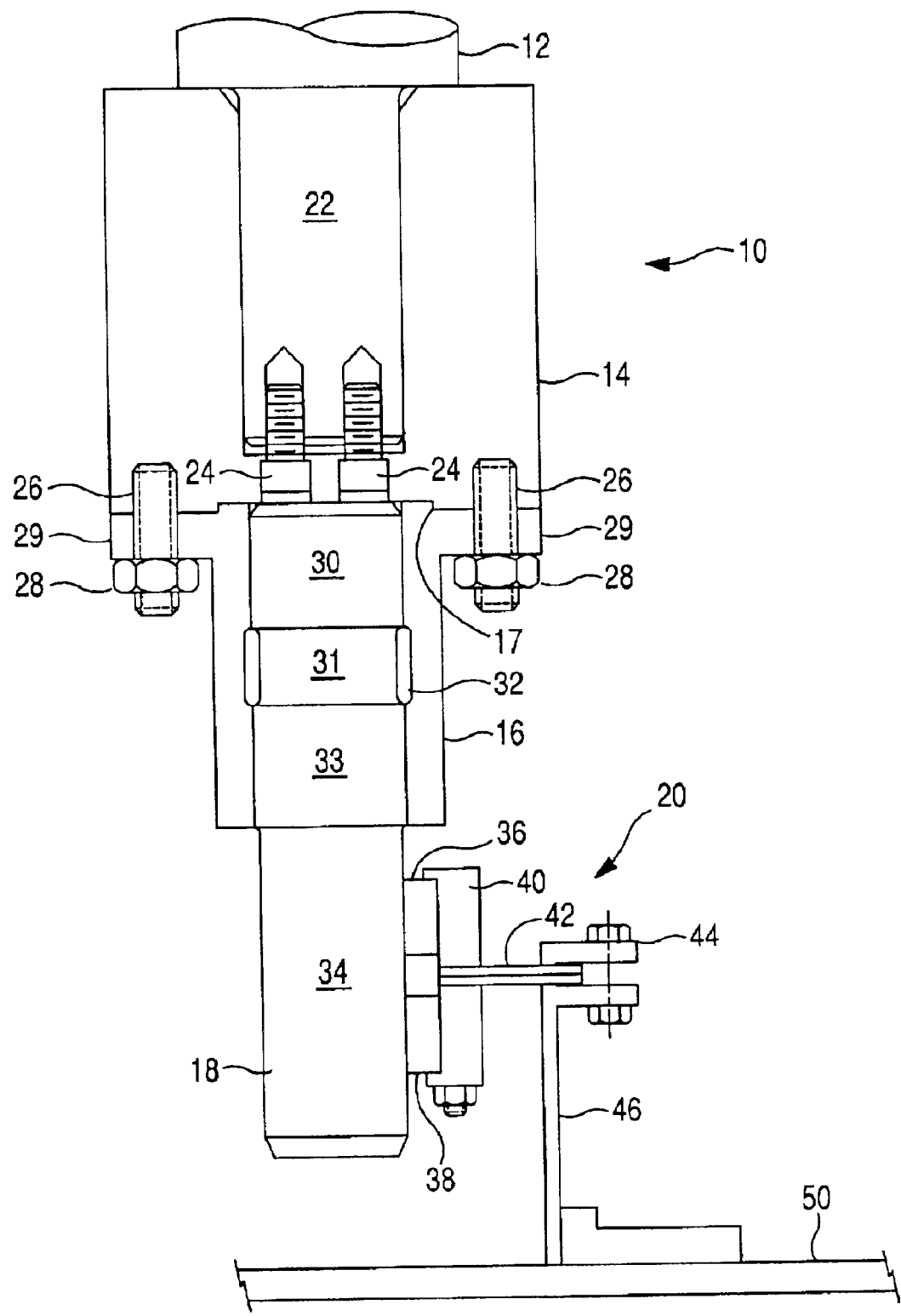
FIG. 1 is a side cross sectional view of a first preferred embodiment of the invention.

Referring now to the drawings in which like elements refer to like numbers throughout, a first embodiment is illustrated in FIG. 1. The apparatus 10 includes the lower end of a impeller shaft 12. In this embodiment, a removable coupling 14 is attached to the lower end of the shaft 12. A support hub 16 is attached to the lower end of the removable coupling 14. The support hub 16 provides a mounting for a stub shaft 18. In this way, the stub shaft 18 is rigidly connected to rotate with the lower end of the impeller shaft 12. The stub shaft 18 is radially constrained by a steady bearing assembly 20.

In the example shown in FIG. 1, the lower end of the shaft 12 terminates in a reduced diameter portion 22. The removable coupling 14 is slid over the reduced diameter portion 22 and is affixed thereto by fasteners 24. Thus, the removable coupling 14 encircles the lower end 22 of the shaft 12, and rotates therewith. The support hub 16 is fastened onto the lower end of the removable coupling 14 by means of fasteners 28 that are fastened into threaded bores 26 on the removable coupling 14.

The support hub 16 has a flange 29 with holes therein so that the fasteners 28 rigidly affix the support hub 16 to the removable coupling 14. In this way, the support hub 16 rotates with the coupling 14 and the shaft 12, and the use of a rabbeted connection 17 provides radial alignment.

The support hub 16, prior to its connection to the removable coupling 14, has been rigidly connected with the stub shaft 18 as follows. In one preferred embodiment, the stub shaft 18 is press-fit into a bore in the coupling 16, so that once the press fit is accomplished, the stub shaft is retained by an interference fit in the support hub 16.

In a preferred embodiment, the stub shaft 18 is made of a ceramic such as silicon carbide, and the support hub is made of a metal alloy such as titanium. Silicone Carbide is a preferred material due to its extremely high hardness, very high modulus of elasticity (high stiffness), almost universal corrosion resistance, ability to withstand very hot environments, dimensional stability, commercially available as a material in a variety of shapes, and its good tribological properties. In order to accomplish a suitable press-fit, it is known to provide a first small diameter region 30 on the stub shaft, a secondary diameter region 31 of even smaller diameter, which provides a manufacturing relief, and a third diameter region 33 of larger diameter. In some embodiments, the stub shaft 18 could instead be a constant diameter. However, in some applications, in order to provide appropriate tolerances for the press fit operation, it is desirable to provide the region 30 and 33 of different diameters, and the region 31 with the manufacturing relief as shown. For example, in order to accomplish the press fit satisfactorily, the outer diameter of the stub shaft and the inner diameter of the bore in the hub may need to be relatively precisely toleranced. If it is difficult to machine a lengthy portion such as the entire inserted length of the stub shaft 18, as well as a lengthy bore in the hub 16, to the needed tolerances, then the relief 31 provides a space between the two toleranced portions 30 and 33, which can each be shorter than the entire inserted length.

Figure 3:
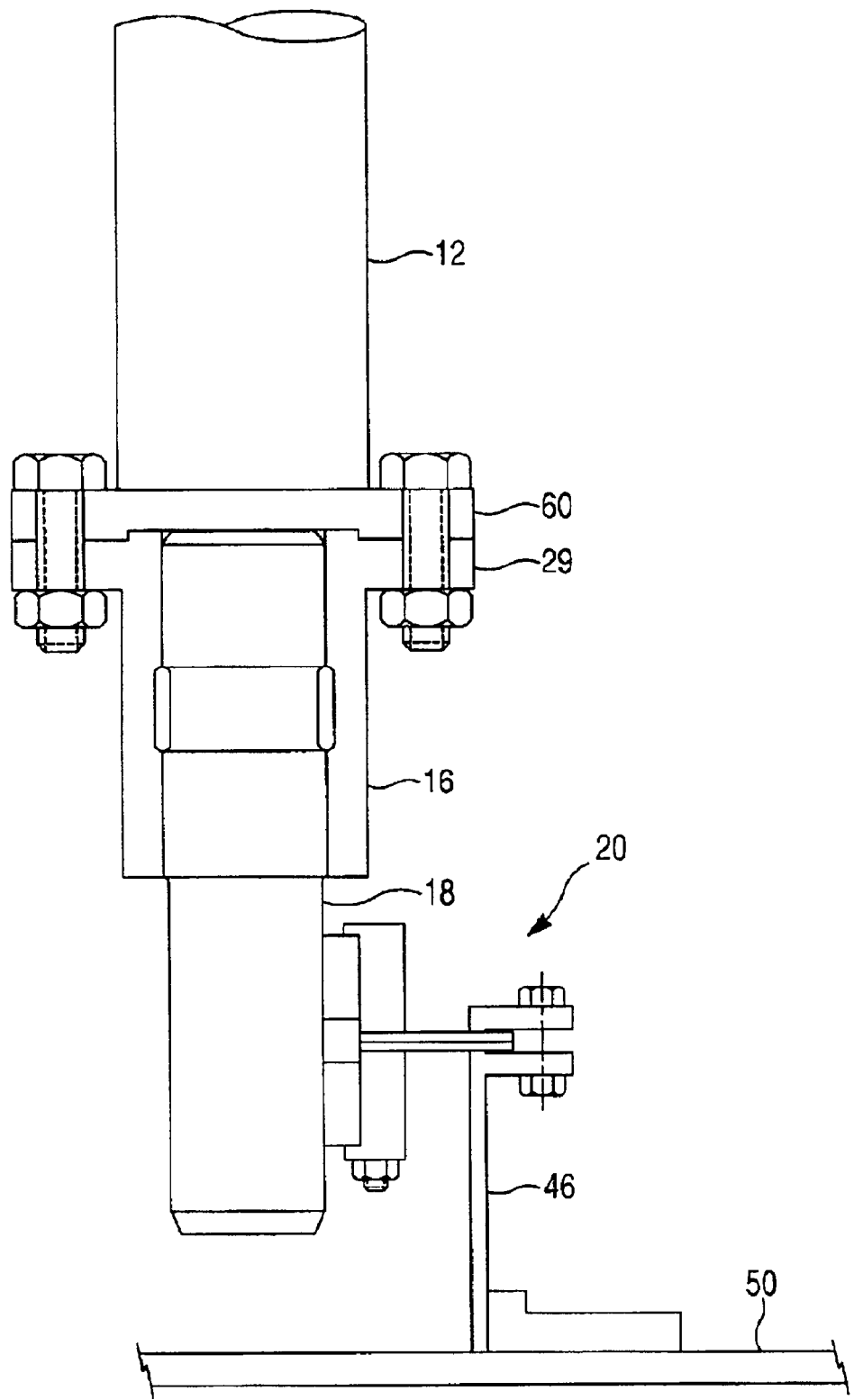
FIG. 3 is a side cross sectional view of a third preferred embodiment.

It can be seen that the arrangement of FIG. 1 provides an easily replaceable stub shaft assembly. In some embodiments, the stub shaft 18 can be mounted in the support hub 16 at factory using press fit techniques. This component having both the stub shaft 18 and support hub 16 can be conveniently attached, detached, and/or replaced onto the coupling 14 at the site of installation of the mixer. If a removable coupling 14 is not used (as shown in FIG. 3), then the component having both the stub shaft 18 and support has hub 16 can be conveniently attached detached, and/or replaced directly onto the shaft 12 by, for example, a flange connection.

The stub shaft 18 is radially constrained by the bearing assembly 20, which includes in the exemplary embodiment an upper bushing 36 and a lower bushing 38. The bushings maybe made of any suitable material, including carbon graphite, polymers, nylon or PEEK. The bushings 36 and 38 are retained by a bushing holder 40. The bushing holder 40 constrained against lateral movement by a flexible arrangement 42, which provides suitable radial constraint, while accommodating a certain degree of off axis bending movement. The flexible supporting arrangement 42, may, for example include a flexible disk pack spanning between the bushing holder 40 and a mounting structure 44. The mounting structure 44 has an arm 46 that is attached to the inner surface of the vessel wall 50.

Figure 4:
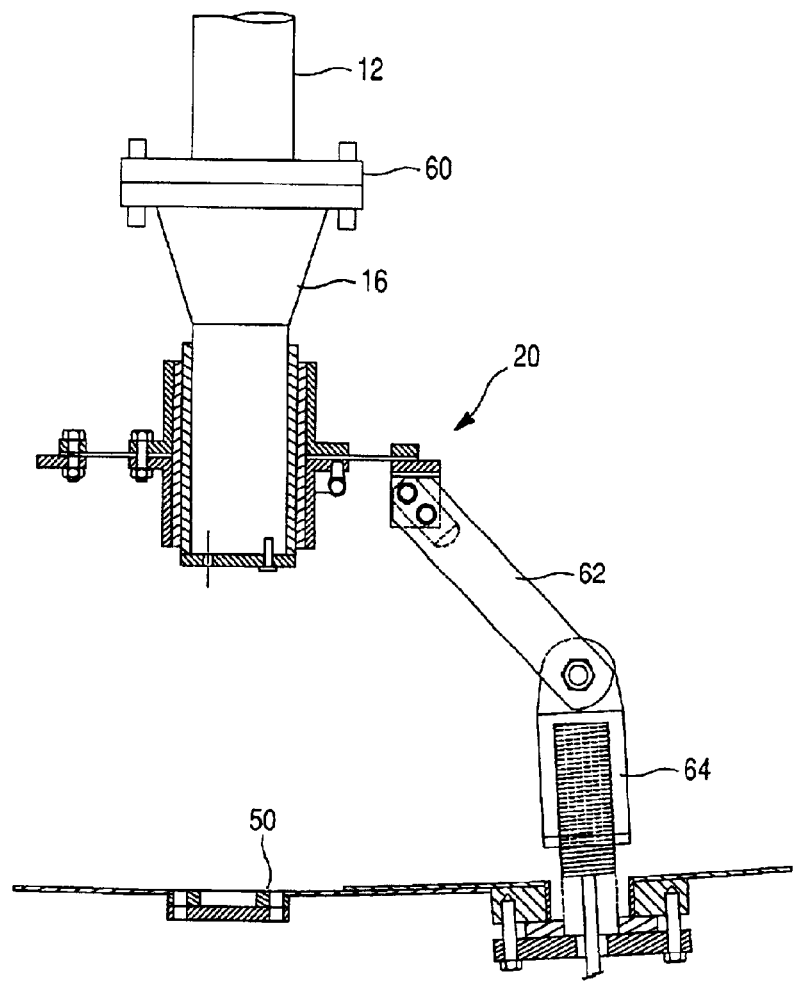
FIG. 4 is a side cross sectional view showing another variation of the invention, and also illustrating in more detail an arrangement for supporting a steady bearing.

The bearing arrangement 20 illustrated in FIG. 4 is for the purposes of giving an example of a preferred embodiment. It will appreciated that other bushing arrangement, bushing support arrangements, and other mounting devices, including those not using flexible disks packs. It may also advantageously be employed in the present invention.

It will be appreciated that the present invention provides the ability to have a stub shaft having desirable wear properties. The other portions of the impeller shaft 12 can be made of stainless steel, which is desirable due to the large loads that are placed on any portions of the impeller shaft 12. At the same time, the arrangement of FIG. 1 provides the removable mounting of a stub shaft 18 which can be made of a wear resistant material which is a ceramic, for example silicone carbide. The combination of shafts of different materials is desirable for example because silicone carbide in an elongated shaft subject to torsional forces can be undesirable due to its brittleness. In the present invention, the stub shaft 18 can be subject to virtually minimal torsional forces, yet can serve primarily provide axial control to the lower end of the impeller shaft 12.

In the embodiment of FIG. 1, a removable coupling 14 is mounted on to the lower end of the impeller shaft 12. This arrangement provides that the removable coupling 14 can be removed from the end of the impeller shaft 12, so that impeller support hubs or other devices can be slid up onto the impeller shaft 12 over the lower end when the coupling 14 is removed.

Figure 2:
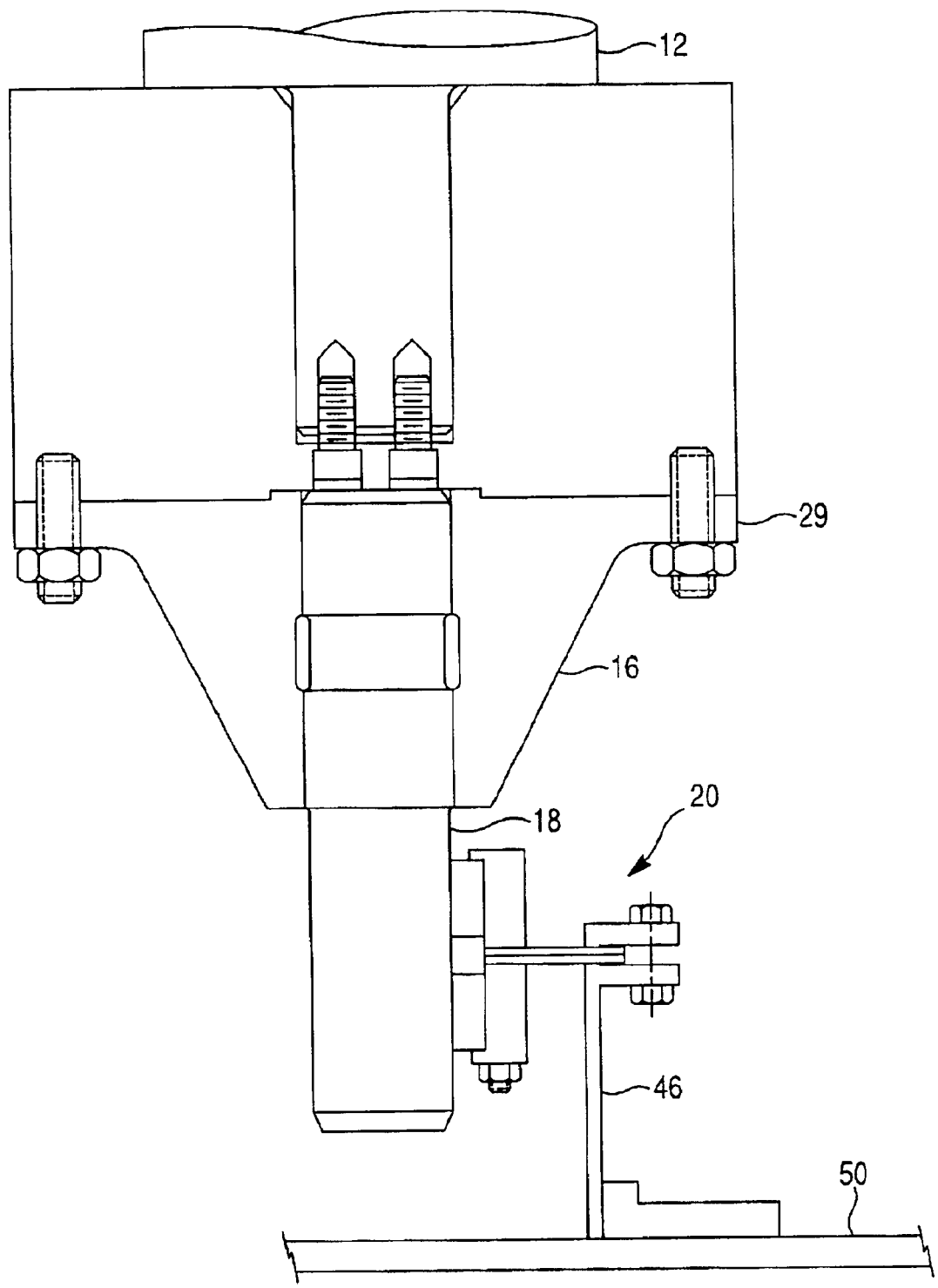
FIG. 2 is a side cross sectional view of a second preferred embodiment.

FIG. 2 illustrates a variation of the embodiment of FIG. 1. In the embodiment of FIG. 2, the support hub 16 has tapered sides, and thus has a tapered thickness along its axial length. This embodiment may be particularly suitable where a significant shaft diameter difference exists between the impeller shaft 12 and the stub shaft 18. The selection of a straight-sided support hub 16 as in FIG. 1, versus a tapered support hub 16 as in FIG. 2, will be determined by factors such as the difference in shaft diameter and the degree of bending forces present in the region of the support hub 16.

Other embodiments of the invention are possible that do not use a removable coupling 14. For example, FIG. 3 illustrates an embodiment where the impeller shaft 12 terminates at its lower end in a flange 60. The flange 60 provides for a convenient fastener connection to the flange 29 of the support hub 16. FIG. 3 illustrates a straight-sided support hub 16. As illustrated in FIG. 4, a tapered sided support hub 16 can also be used with a impeller shaft 12 having a flange 60. FIG. 4 also illustrates that the bearing assembly 20 includes a support arm 62 connected to a mounting point 64 attached to the lower wall 50 of the vessel.

It will be appreciated that embodiments of the invention provide the connection of a stub shaft made of a wear-resistant material, onto the end of the lower end of the driven impeller shaft. Embodiments of the invention also provide an apparatus and method for connecting shafts to one another that are made of dissimilar materials. Moreover, the above-described arrangements can be conveniently installed and serviced.

Figure 5:
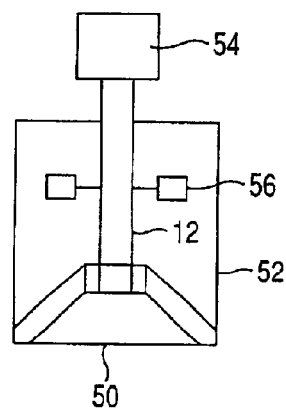
FIG. 5 is a schematic view of a mixer assembly incorporating the present invention.

FIG. 5 illustrates schematically a mixer assembly with which the shaft and bearing arrangement can be utilized. The lower wall 50 is part of the vessel 52 that contains the material as being mixed. A motor 54 rotationally drives the impeller shaft 12 to move impellers 56 through the material.

The many features and advantages of the invention are apparent from the detailed specification, and thus, it is intended by the appended claims to cover all such features and advantages of the invention which fall within the true spirits and cope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for restraining an end of a rotatable impeller shaft, comprising:

a support hub connected to the end of the impeller shaft for rotation therewith;

a stub shaft rigidly mounted to the support hub for rotation therewith; and a steady bearing surrounding at least a portion of the stub shaft;

wherein the stub shaft is mounted to the support hub via an interference press fit.

2. An apparatus according to claim 1, wherein said stub shaft is made of ceramic material.

3. An apparatus according to claim 2, wherein said ceramic material is silicon carbide.

4. An apparatus according to claim 2, wherein said impeller shaft is made of steel.

5. An apparatus according to claim 1, further comprising a removable coupling attached to the end of the impeller shaft that connects the support hub to the end of the impeller shaft.

6. An apparatus according to claim 1, wherein the support hub is connected to the end of the impeller shaft by a flanged connection.

7. An apparatus according to claim 1, wherein the steady bearing comprises at least one bushing surrounding at least a portion of the stub shaft.

8. An apparatus according to claim 1, wherein said support hub is made of metal.

9. An apparatus according to claim 8, wherein the metal is steel.

10. An apparatus for restraining an end of a rotatable impeller shaft, comprising:

a stub shaft;

supporting means for supporting the stub shaft, said supporting means connected to the end of the impeller shaft for rotation therewith, wherein the stub shaft is mounted to said supporting means via an interference press fit; and bearing means for radially restraining at least a portion of the stub shaft.

11. An apparatus according to claim 10, wherein said stub shaft is made of ceramic material.

12. An apparatus according to claim 11, wherein said ceramic material is silicon carbide.

13. An apparatus according to claim 11, wherein said impeller shaft is made of metal.

14. An apparatus according to claim 11, wherein said impeller shaft is made of composite material.

15. An apparatus according to claim 10, further comprising a removable coupling means removably attached to the end of the impeller shaft for connecting the supporting means to the end of the impeller shaft.

16. A method for restraining an end of a rotatable impeller shaft, comprising the steps of:

mounting a stub shaft in a support hub;

attaching the support hub to the lower end of the impeller shaft; and placing the stub shaft into a bearing assembly, wherein the step of mounting the stub shaft in the support hub comprises press-fitting the shaft into a bore in the support hub to provide an interference press fit.

17. A method according to claim 16, further including the steps of heating the support hub to above ambient temperature and cooling the stub shaft to below ambient temperature before press fitting the stub into the support hub.

18. A method according to claim 16, wherein the stub shaft is a ceramic material.

19. A method according to claim 18, wherein the ceramic material is silicon carbide.

* * * * *